United States Patent [19]

DeGenova et al.

[11] Patent Number: 5,389,693
[45] Date of Patent: Feb. 14, 1995

[54] INTEGRAL SKIN POLYURETHANE FOAMS AND PROCESS FOR THE PREPARATION THEREOF

[75] Inventors: Ricardo DeGenova; Freddie E. Polk, both of Lake Jackson, Tex.

[73] Assignee: The Dow Chemical Company, Midland, Mich.

[21] Appl. No.: 250,965

[22] Filed: May 31, 1994

[51] Int. Cl.⁶ .................................................. C08J 9/34
[52] U.S. Cl. ..................................... 521/51; 521/159; 521/160
[58] Field of Search ........................... 521/51, 159, 160

[56] References Cited

U.S. PATENT DOCUMENTS

| | | | |
|---|---|---|---|
| 4,334,032 | 6/1982 | Patton, Jr. | 521/115 |
| 4,994,540 | 2/1991 | Boerner et al. | 521/137 |
| 5,208,270 | 5/1993 | Dai | 521/129 |

*Primary Examiner*—Morton Foelak

[57] ABSTRACT

Integral skin polyurethane foams can be prepared using formulations having no HCFC or CFC blowing agents. Such formulations, having water as the only or major blowing agent can also have good physical properties such as low post-blow expansion. A formulation useful for preparing such integral skin polyurethane foams includes:

(A) an organic isocyanate functional admixture including
 (i) a methylene diphenyl diisocyanate soft segment prepolymer,
 (ii) methylene diphenyl diisocyanate and
 (iii) polymethylene polyphenyl polyisocyanate,
(B) an active hydrogen containing material,
(C) a catalyst and
(D) a blowing agent.

15 Claims, No Drawings

INTEGRAL SKIN POLYURETHANE FOAMS AND PROCESS FOR THE PREPARATION THEREOF

BACKGROUND OF THE INVENTION

The present invention relates to integral skin polyurethane foams. The present invention particularly relates to all-water-blown integral skin polyurethane foams.

Integral skin polyurethane foams are used in a wide variety of applications. For example, such foams have been found useful in applications such as furniture and automobile manufacturing. Integral skin polyurethane foams have been found to be particularly useful in the production of automobile steering wheels, spoilers, arm rests, head rests and the like.

The "integral skin" of integral skin polyurethane foam is a tough resilient layer covering the foam interior of objects made of integral skin polyurethane foam. In conventional integral skin polyurethane foams, the skin is formed when, during the foaming process, a reaction admixture typically including CFC-11 is placed into a closed mold. A reaction exotherm causes the CFC-11 to vaporize and separate from the reaction admixture. The CFC-11, upon coming into contact with the comparatively cool mold wall in the presence of the comparatively higher pressure inside the mold, condenses. The liquid CFC-11 on the mold wall causes the cell layer adjacent to the mold wall to collapse, forming the "integral skin". The integral skin of integral skin polyurethane foam can have desirable appearance, touch and durability.

Foams are prepared by frothing a liquid matrix. In preparing a foam, a source of vapor or gas must be provided in order to froth the liquid matrix. Materials which produce or act as these sources of gas or vapor are called blowing agents. A blowing agent is a material which vaporizes or otherwise produces gas during the forming of a foam and thereby serves to reduce the density of the foam. Chlorofluorocarbons have long been used as blowing agents for flexible polyurethane foams. However, due to environmental considerations, the use of chlorofluorocarbons has been increasingly discouraged and use of alternative blowing agents has been found to be desirable.

An example of an alternative type of blowing agent is carbon dioxide. Foams produced from formulations having blowing agents which generate carbon dioxide are considered environmentally superior to foams prepared utilizing only chlorofluorocarbon blowing agents. Water reacts with isocyanates in integral skin polyurethane foam formulations to produce carbon dioxide and is an example of a carbon dioxide producing blowing agent.

While it has been found desirable to reduce the use of chlorofluorocarbon blowing agents, it has not always been trouble-free to do so. Chlorofluorocarbons often contribute to the physical properties of the foams produced therewith. For example, foams produced from formulations having carbon dioxide generating blowing agents rather than chlorofluorocarbon blowing agents often have poorer dimensional stability. Therefore, it would be desirable in the art to prepare a water-blown integral skin polyurethane foam with dimensional stability similar to that of conventional integral skin polyurethane foams.

SUMMARY OF THE INVENTION

In one aspect, the present invention is an integral skin polyurethane foam formulation comprising: (A) an organic isocyanate functional admixture including (i) a methylene diphenyl diisocyanate soft segment prepolymer, (ii) methylene diphenyl diisocyanate and (iii) polymethylene polyphenyl polyisocyanate, (B) an active hydrogen containing compound, (C) a catalyst and (D) a blowing agent.

In another aspect, the present invention is an integral skin polyurethane foam prepared by a process comprising admixing a formulation including: (A) an organic isocyanate functional admixture including (i) a methylene diphenyl diisocyanate soft segment prepolymer, (ii) methylene diphenyl diisocyanate and (iii) polymethylene polyphenyl polyisocyanate, (B an active hydrogen containing material, (C) a catalyst and (D) a blowing agent.

In still another aspect, the present invention is an organic isocyanate functional admixture comprising: (i) a methylene diphenyl diisocyanate soft segment prepolymer, (ii) methylene diphenyl diisocyanate and (iii) polymethylene polyphenyl polyisocyanate.

DESCRIPTION OF THE PREFERRED EMBODIMENTS

In one embodiment, the present invention is an integral skin polyurethane foam formulation comprising: (A) an organic isocyanate functional admixture including (i) a methylene diphenyl diisocyanate soft segment prepolymer, (ii) methylene diphenyl diisocyanate and (iii) polymethylene polyphenyl polyisocyanate, (B) an active hydrogen containing material, (C) a catalyst and (D) a blowing agent. Component (A), the organic isocyanate functional admixture, is prepared by admixing (i) a methylene diphenyl diisocyanate soft segment prepolymer, (ii) methylene diphenyl diisocyanate and (iii) polymethylene polyphenyl polyisocyanate. Admixing the components of the organic isocyanate functional admixture can be done at any time in the preparation of the integral skin polyurethane foams of the present invention, up to and including the time at which all of the foam formulation components are admixed. But preferably, the organic isocyanate functional admixture is prepared prior to preparing the foam.

The methylene diphenyl diisocyanate soft segment prepolymer, component (A)(i), of the present invention can be prepared by any method known to be useful for preparing prepolymers to those of ordinary skill in the art of preparing polyurethane prepolymers. Preferably, the prepolymer is prepared by admixing methylene diphenyl diisocyanate, a high molecular weight polyol and a chain extender under reaction conditions sufficient to prepare a prepolymer. The methylene diphenyl diisocyanate used to prepare the prepolymer can be any which includes at least 85 percent of the p,p' isomer. Preferably the methylene diphenyl diisocyanate includes at least 87 and even more preferably the methylene diphenyl diisocyanate includes at least 90 percent p,p' isomer.

A high molecular weight polyol is used to prepare the methylene diphenyl diisocyanate soft segment prepolymer of component (A)(i). Preferably the polyol has a weighted average molecular weight of from about 2,500 to about 8,000, more preferably from about 2,750 to about 7,000 and even more preferably from about 3,000 to about 6,000, as determined by Gel Permeation Chromatography, comparing the polyols to polymers of known molecular weight. All subsequent polyol molecular weights are also determined by this method. Also preferable for preparing the prepolymer are polyols having a functionality of at least 2 and more preferably from about 3 to about 4 wherein most of the hydroxyl groups are primary. While any polyol having these properties can be used with the present invention, preferably the polyol is a polyether polyol prepared by admixing a trifunctional initiator such as glycerine with propylene oxide in the presence of a basic catalyst and then end capping the resulting polyol with ethylene oxide. Methods of preparing polyols, particularly polyether polyols are well known and are described in U.S. Pat. Nos. 1,922,495, 3,190,927, and 3,346,557. Such polyols are also described in publications such as *Reaction Polymers,* 66–124 (1992) and H. Ulrich, *Introduction to Industrial Polymers,* 90–91 (1982).

A chain extender is also used to prepare the methylene diphenyl diisocyanate soft segment prepolymer of component (A)(i). Such chain extending agents include those having two active hydrogen groups per molecule. Monomers useful as chain extending agents include ethylene glycol, diethylene glycol, propylene glycol, 1,4-butanediol and the like. Chain extenders useful with the present invention also include low molecular weight polyglycols. The chain extenders of the present invention have a molecular weight of from about 60 to about 500, preferably from about 100 to 400 and even more preferably from about 150 to about 300.

The methylene diphenyl diisocyanate soft segment prepolymer of the present invention, component (A)(i), can be prepared by any method known to be useful to those of ordinary skill in the art of preparing prepolymers. Preferably, the prepolymer components are admixed in the absence of a catalyst, under reaction conditions sufficient to prepare a prepolymer, but a catalyst can be used. The resulting prepolymer has an isocyanate equivalent weight of from about 150 to about 400, more preferably from about 200 to about 300, and even more preferably from about 230 to about 240, as determined titrametrically using butylamine, first reacting the isocyanate with butylamine and then back-titrating the residual butylamine with an acid. All subsequent determinations of isocyanate equivalent weight are done by this method.

Preferably, component (A)(ii) of the present invention is a modified methylene diphenyl diisocyanate. Preferably, the modified methylene diphenyl diisocyanate is a carbodiimide modified methylene diphenyl diisocyanate. The modified methylene diphenyl diisocyanate can be prepared by any method known to be useful for preparing such materials by those skilled in the art of preparing modified methylene diphenyl diisocyanate. For example, the modified methylene diphenyl diisocyanate can be prepared by admixing methylene diphenyl diisocyanate with triethylphosphate and heating until an isocyanate equivalent weight of 143 is achieved. Modified methylene diphenyl diisocyanates useful with the present invention have an isocyanate equivalent weight of from about 143 to about 147.

Component (A)(iii) of the present invention is polymethylene polyphenyl polyisocyanate. Polymethylene polyphenyl polyisocyanate useful with the present invention has from about 2 to about 20 percent, preferably from about 5 to about 15 percent by weight of the 2,4' isomer. The polymethylene polyphenyl polyisocyanate has an isocyanate equivalent weight of from about 127 to about 145, preferably from about 129 to about 136, and even more preferably from about 131 to about 133.

The three substituents of component(A), (i) a methylene diphenyl diisocyanate soft segment prepolymer, (ii) methylene diphenyl diisocyanate and (iii) polymethylene polyphenyl polyisocyanate are admixed to yield an organic isocyanate functional material having an isocyanate equivalent weight of from about 200 to about 230, preferably from about 205 to about 225 and even more preferably from about 205 to 210. When components (A)(i–iii) are admixed together, component (A) will consist of from about 65 to about 85 percent, more preferably from about 70 to about 80 percent by weight of the (A)(i) prepolymer, from about 10 to 20, preferably from about 13 to about 17 percent by weight of the modified methylene diphneyl diisocyanate, and from about 5 to about 15, preferably from about 6 to about 10 percent by weight of the polymethylene polyphenyl polyisocyanate.

Component B of the present invention is an active hydrogen containing material. In preparing the integral skin polyurethane foams of the present invention, an "A" component is mixed with a "B" component which is an active hydrogen containing compound. The active hydrogen containing compounds of the "B" component can be either the same as those used to prepare the prepolymer of the "A" component or they can be different. Active hydrogen containing compounds most commonly used in polyurethane production are those compounds having at least two hydroxyl groups. Those compounds are referred to herein as polyols. Representatives of suitable polyols are generally known and are described in such publications as *High Polymers,* Vol. XVI, "Polyurethanes, Chemistry and Technology" by Saunders and Frisch, Interscience Publishers, New York, Vol. I, pp. 32–42, 44–54 (1962) and vol. II, pp. 5–6, 198–199 (1964); *Organic Polymer Chemistry* by K. J. Saunders, Chapman and Hall, London, pp. 323–325 (1973); and *Developments in Polyurethanes,* Vol. I, J. M. Burst, ed., Applied Science Publishers, pp. 1–76 (1978). However, any active hydrogen containing compound can be used with the method of this invention. Examples of such materials include those selected from the following classes of compositions, alone or in admixture: (a) alkylene oxide adducts of polyhydroxyalkanes; (b) alkylene oxide adducts of nonreducing sugars and sugar derivatives; (c) alkylene oxide adducts of phosphorus and polyphosphorus acids; and (d) alkylene oxide adducts of polyphenols. Polyols of these types are referred to herein as "base polyols". Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. Preferred herein as alkylene oxide adducts of polyhydroxyalkanes are the ethylene oxide adducts of trihydroxyalkanes. Other useful adducts include ethylene diamine, glycerin, ammonia, 1,2,3,4-tetrahydroxy butane, fructose, and sucrose.

Also suitable for use with the present invention are poly(oxypropylene) glycols, triols, tetrols and hexols and any of these that are capped with ethylene oxide. These polyols also include poly(oxypropyleneoxyethylene)polyols. The oxyethylene content should preferably comprise less than about 80 weight percent of the total and more preferably less than about 40 weight percent. The ethylene oxide, when used, can be incorporated in any way along the polymer chain, for example, as internal blocks, terminal blocks, or randomly distributed blocks, or any combination thereof.

The base polyols described hereinabove can contain small amounts of "inherent" unsaturation, i.e., unsaturation due to the isomerization of propylene oxide to allyl alcohol during the manufacture of the polyol. In some cases it may be desirable to include additional unsaturation in the polyols. In other cases, it may be desirable to use polyols having little or no unsaturation.

Polyamines, amine-terminated polyols, polymercaptans and other isocyanate-reactive compounds are also suitable in the present invention. Polyisocyanate polyaddition active hydrogen containing compounds (PIPA) are also useful with the present invention. PIPA compounds are typically the reaction products of TDI and triethanolamine. A method for preparing PIPA compounds can be found in, for example, U.S. Pat. No. 4,374,209, issued to Rowlands.

Another class of particularly preferred polyols are "copolymer polyols", which are base polyols containing stably dispersed polymers such as acrylonitrile-styrene copolymers. Production of these copolymer polyols can be from reaction mixtures comprising a variety of other materials, including, for example, catalysts such as azobisisobutyronitrile; copolymer polyol stabilizers; and chain transfer agents such as isopropanol.

The polyols useful as component B of the present invention are preferably those having a functionality of from about 2 to about 4 and a molecular weight of from about 2,000 to about 8,000, preferably from about 3,000 to about 6,000. Even more preferred are copolymer polyols having such properties as well as from about 10 to about 50, preferably from about 20 to about 50 percent solids by weight. It is also desirable that the copolymer polyol be an ethylene oxide capped polyoxypropylene polyether polyol.

Component (C) of the present invention is a catalyst or catalyst admixture. Catalysts are commonly used for promoting the urethane reaction. The catalyst is preferably incorporated into the formulation in an amount suitable to increase the rate of reaction between the isocyanate groups and the active hydrogen containing materials of the present invention. Although a wide variety of materials is known to be useful for this purpose, the most widely used and preferred catalysts are the tertiary amine catalysts and the organotin catalysts.

Examples of the tertiary amine catalysts include, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-diethyl-3-diethyl aminopropylamine, dimethylbenzyl amine and the like. Tertiary amine catalysts are advantageously employed in an amount from about 0.01 to about 2 percent by weight of the polyol formulation.

Examples of organotin catalysts include dimethyltin dilaurate, dibutyltin dilaurate, dioctyltin dilaurate, stannous octoate and the like. Other examples of effective catalysts include those taught in, for example, U.S. Pat. No. 2,846,408. Preferably the organotin catalyst is employed in an amount from about 0.001 to about 0.5 percent by weight of the polyol formulation.

The foams of the present invention are prepared using a blowing agent, component (D). The foams of present invention are predominantly water blown. For purposes of the present invention, predominantly water blown means that the foam is prepared with little or no blowing agent other than water. Surprisingly, despite being prepared from formulations including little or no CFC or HCFC blowing agents, the foams of the present invention have surfaces of sufficient density and resiliency to be useful in integral skin foam applications.

The integral skin polyurethane foam formulations of the present invention can also include additives. Exemplary of such additives are fire retardants, surfactants, pigments, mold release agents, fillers, structural reinforcements and the like. For example, the formulations of the present invention can include compounds such as diethanolamine to avoid cell collapse. The formulations of the present invention can include silicone surfactants to improve compatibility.

The integral skin polyurethane flexible foams of the present invention advantageously have very good dimensional stability after molding. A disadvantage of conventional formulations using water as a blowing agent in integral skin formulation applications can be excessive post expansion. Post expansion of a foam is evidenced by an increase in the dimensions of the foam after the foam is demolded. It is desirable in the manufacture of molded foam parts to have as fast a cycle time on machines preparing molded foam parts as possible. But if a part continues to expand after it is removed from the mold, it can possibly "not fit" in its intended installation point. Post expansion can also cause undesirable cosmetic properties such as the forming of gas bubbles under the skin of a foam also known as "blistering".

The following examples are provided to illustrate the present invention. The examples are not intended to limit the scope of the present invention and they should not be so interpreted. Amounts are in weight parts or weight percentages unless otherwise indicated.

EXAMPLE 1

An organic isocyanate functional admixture is prepared by admixing 15 parts of a carbodiimide modified methylene diphenyl diisocyanate having an isocyanate equivalent weight of about 143, 8 parts polymethylene polyphenyl polyisocyanate having an o'p' isomer content of about 13 percent and 77 parts of a methylene diphenyl diisocyanate soft segment prepolymer. The methylene diphenyl diisocyanate soft segment prepolymer is prepared by admixing 65 parts methylene diphenyl diisocyanate; 28 parts of a 4,800 molecular weight, ethylene oxide capped trifunctional oxypropylene polyether; and 7 part tripropylene glycol. The resulting organic isocyanate functional admixture has an isocyanate equivalent weight of 204.

EXAMPLE 2

An integral skin polyurethane foam is prepared by admixing an "A side" consisting of the organic isocyanate functional admixture of Example 1 with a "B side". The B side is an admixture prepared by admixing the components listed in Table 1:

TABLE 1

| | PARTS BY WEIGHT |
|---|---|
| Polyol A | 60 |
| Polyol B | 40 |
| Ethylene Glycol | 6.0 |
| Diethanolamine | 0.5 |
| Water | 0.5 |
| Catalyst A | 0.4 |

TABLE 1-continued

| PARTS BY WEIGHT | |
|---|---|
| Catalyst B | 0.4 |
| Surfactant A | 0.3 |

Polyol A is VORANOL 4701*, a 4,800 molecular weight, ethylene oxide capped trifunctional oxypropylene polyether.
Polyol B is VORANOL 4925*, a styrene acrylonitrile copolymer polyol having about 25 percent solids, an equivalent weight of about 2,130 and trifunctionality.
Catalyst A is DABCO-1027**, an active amine in ethylene glycol catalyst.
Catalyst B is NIAX-107***, a tertiary amine delayed action catalyst.
Surfactant A is L-5302***, a silicone surfactant.
*VORANOL 4701 and VORANOL 4925 are trade designations of The Dow Chemical Company.
**DABCO-1027 is a trade designation of Air Products and Chemicals, Inc.
***NIAX-107 and L-5302 are trade designations of Union Carbide Corp.

The A and B sides are placed into separate tanks and maintained at 40° C. The A and B sides are then admixed at 7,000 rpm using a 30 lbs/min low pressure foam machine and poured into a waxed metallic mold having a cavity of 300×300×254 mm and held at 45° C. As soon as the pour is complete, the mold is closed. After 5 minutes, the mold is opened and the foam removed. The foam is held under ambient conditions for 7 days and tested according to ASTM D-3574-86, the results of which are displayed below in Table 2. The foams have integral skins with desirable cosmetic and touch properties.

TABLE 2

|  | Sample 2-1 | Sample 2-2 |
|---|---|---|
| Ratio A/B | 0.64/1.0 | 0.64/1.0 |
| Molded Density lbs/ft$^3$ | 19.1 | 26.5 |
| ILD 25% lbs | 97.9 | 179.7 |
| ILD 65% lbs | 287.0 | 617.7 |
| Tear Strength pli | 8.31 | 10.08 |
| Tensile Strength psi | 216.3 | 279.6 |
| Elongation % | 196 | 181 |

EXAMPLE 3 AND COMPARATIVE EXAMPLE 4–7

An integral skin polyurethane foam is prepared by admixing an "A side" with a "B side" as detailed below in Tables 3 and 4. The A and B sides are admixed at a ratio to produce an isocyanate index of 100 using a stirrer having a 3 inch diameter blade at 3,000 rpm for 5 seconds. An isocyanate index is the value represented by dividing the total number of isocyanate equivalents in a formulation by the total number of active hydrogen equivalents and then multiplying by 100. The admixed A and B sides are poured into a metal mold having a cavity 204×204×16 mm and held at 120°–130° F. After 2 minutes, the foams are demolded and the dimensions of the foams are determined. The dimensions of the foams are also set out below in Table 4.

TABLE 3

|  | EXAMPLE 3 | COMPARATIVE EXAMPLE 4* | COMPARATIVE EXAMPLE 5* | COMPARATIVE EXAMPLE 6* | COMPARATIVE EXAMPLE 7* |
|---|---|---|---|---|---|
| Polyol A[1] | 60 | 40 | 60 | 60 | 60 |
| Polyol C[2] | — | 20 | — | — | — |
| Polyol D[3] | 40 | 35 | 40 | 40 | 40 |
| Polyol E[4] | — | 3.0 | — | — | — |
| Ethylene Glycol | 6.0 | 12 | 6.0 | 6.0 | 6.0 |
| Diethanolamine | 0.5 | — | 0.5 | 0.5 | 0.5 |
| Water | 0.5 | — | 0.5 | 0.5 | 0.5 |
| CFC-11 | — | 12 | — | — | — |
| Catalyst A[5] | 1.5 | — | 1.5 | 1.5 | 1.5 |
| Catalyst B[6] | 0.4 | 0.9 | 0.4 | 0.4 | 0.4 |
| Catalyst C[7] | — | 0.4 | — | — | — |
| Catalyst D[8] | — | 0.2 | — | — | — |
| Light Abs. A[9] | 0.5 | — | 0.5 | 0.5 | 0.5 |
| Light Abs. B[10] | 0.5 | — | 0.5 | 0.5 | 0.5 |
| Surfactant A[11] | 0.6 | — | 0.6 | 0.6 | 0.6 |
| Antioxidant A[12] | 0.25 | — | 0.25 | 0.25 | 0.25 |
| Black Pigment | 5.0 | 5.0 | 5.0 | 5.0 | 5.0 |

*Not an example of the present invention.
[1]Polyol A is VORANOL 4701$^a$, a 4,800 molecular weight, ethylene oxide capped trifunctional oxypropylene polyether.
[2]Polyol C is VORANOL 4240$^a$, a 4,000 molecular weight ethylene oxide capped difunctional oxypropylene polyether.
[3]Polyol D is VORANOL 4935$^a$, a styrene acrylonitrile copolymer polyol having about 35 percent solids, an equivalent weight of 2,435 and trifunctionality.
[4]Polyol E is VORANOL 4053$^a$, a 12,500 molecular weight, mixed oxide polyether polyol having a functionality of about 7.
[5]Catalyst A is DABCO-1027$^b$, an active amine in ethylene glycol catalyst.
[6]Catalyst B is NIAX A-107$^c$, a tertiary amine delayed action catalyst.
[7]Catalyst C is DABCO XDM$^b$, a N,N-dimethylaminoethyl morpholine catalyst.
[8]Catalyst D is DABCO 33-LV$^b$, a triethylene diamine in dipropylene glycol catalyst.
[9]Light Absorber A$^d$ is TINUVIN 328.
[10]Light Absorber B$^d$ is TINUVIN 765.
[11]Surfactant A is L-5302$^c$, a silicone surfactant.
[12]Antioxidant A is IRGANOX 245$^d$ which is a sterically hindered phenolic antioxidant.
$^a$VORANOL 4701, VORANOL 4240, VORANOL 4935 and VORANOL 4053 are trade designations of The Dow Chemical Company.
$^b$DABCO-1027, DABCO XDM and DABCO 33-LV are trade designations of Air Products and Chemicals, Inc.
$^c$NIAX A-107 and L-5302 are trade designations of Union Carbide Corp.
$^d$TINUVIN 328, TINUVIN 765 and IRGANOX 245 are trade designations of Ciba Geigy.

TABLE 4

|  | Example 3 | Comparative Example 4* | Comparative Example 5* | Comparative Example 6* | Comparative Example 7* |
|---|---|---|---|---|---|
| Isocyanate 1 | X |  |  |  |  |
| Isocyanate 2 |  | X | X |  |  |
| Isocyanate 3 |  |  |  | X |  |
| Isocyanate 4 |  |  |  |  | X |
| Index | 100 | 100 | 100 | 100 | 100 |

TABLE 4-continued

|  | Example 3 | Comparative Example 4* | Comparative Example 5* | Comparative Example 6* | Comparative Example 7* |
| --- | --- | --- | --- | --- | --- |
| Dimensions | 204 × 204 × 16 mm | 204 × 204 × 16 mm | 216 × 216 × 17 mm | 215 × 215 × 17 mm | 211 × 211 × 17 mm |

*Not an example of the present invention.
Isocyanate 1 is a an organic isocyanate functional admixture of Example 1.
Isocyanate 2 is a 1:1 admixture of a methylene diphenyl diisocyanate/dipropylene glycol/tripropylene glycol prepolymer having an isocyanate equivalent weight of about 181 and a polymethylene polyphenyl polyisocyanate having an isocyanate equivalent weight of about 131 and an o′p isomer content of about 10 percent.
Isocyanate 3 is a polymethylene polyphenyl polyisocyanate having an isocyanate equivalent weight of about 131 and an o′p′ isomer content of about 10 percent.
Isocyanate 4 is a carbodiimide modified methylene diphenyl diisocyanate having an isocyanate equivalent weight of about 193.

What is claimed is:

1. An integral skin polyurethane foam formulation comprising:
(A) an organic isocyanate functional admixture including
 (i) a methylene diphenyl diisocyanate soft segment prepolymer,
 (ii) methylene diphenyl diisocyanate and
 (iii) polymethylene polyphenyl polyisocyanate,
(B) an active hydrogen containing material,
(C) a catalyst and
(D) a blowing agent.

2. The formulation of claim 1 wherein methylene diphenyl diisocyanate used to prepare the prepolymer can be any which includes at least 85 percent of the p,p′ isomer.

3. The formulation of claim 2 wherein the polyol used to prepare the prepolymer has a weighted average molecular weight of from about 2,500 to about 8,000 and a functionality of at least 2.

4. The formulation of claim 3 wherein the prepolymer has an isocyanate equivalent weight of from about 150 to about 400.

5. The formulation of claim 1 wherein the methylene diphenyl diisocyanate is a modified methylene diphenyl diisocyanate.

6. The formulation of claim 5 wherein the modified methylene diphenyl diisocyanate is a carbodiimide modified methylene diphenyl diisocyanate.

7. The formulation of claim 1 wherein the polymethylene polyphenyl polyisocyanate includes from about 2 to about 20 weight percent of the 2,4′ isomer.

8. The formulation of claim 7 wherein the polymethylene polyphenyl polyisocyanate includes from about 5 to about 15 weight percent of the 2,4′ isomer.

9. The formulation of claim 1 wherein the polymethylene polyphenyl polyisocyanate has an isocyanate equivalent weight of from about 127 to about 145.

10. The formulation of claim 9 wherein the polymethylene polyphenyl polyisocyanate has an isocyanate equivalent weight of from about 129 to about 136.

11. The formulation of claim 1 wherein component (B) includes a copolymer polyol.

12. The formulation of claim 11 wherein the copolymer polyol is an acrylonitrile-styrene copolymer polyol.

13. The formulation of claim 11 wherein the copolymer polyol is a solids content of from about 20 to about 50 percent by weight.

14. The formulation of claim 11 wherein Component B has an OH equivalent weight of from about 2,000 to about 8,000 and a functionality of from about 2 to about 4.

15. The formulation of claim 1 wherein the blowing agent is water.

* * * * *